US009874279B1

(12) United States Patent
Guo et al.

(10) Patent No.: US 9,874,279 B1
(45) Date of Patent: Jan. 23, 2018

(54) SYSTEM AND METHOD FOR OPERATING A CONTINUOUSLY VARIABLE TRANSMISSION OF A WORK VEHICLE IN A HYDROSTATIC BYPASS MODE

(71) Applicant: CNH Industrial America, LLC, New Holland, PA (US)

(72) Inventors: Haibo Guo, Napperville, IL (US); Shusen Zhang, Downers Grove, IL (US); Cecil A. Weeramantry, Darien, IL (US); Brian E. Felsing, Park Ridge, IL (US); Robert C. Prasse, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/290,088

(22) Filed: Oct. 11, 2016

(51) Int. Cl.
*F16H 61/70* (2006.01)
*F16H 37/04* (2006.01)
*F16H 47/04* (2006.01)

(52) U.S. Cl.
CPC ........... *F16H 61/70* (2013.01); *F16H 37/042* (2013.01); *F16H 47/04* (2013.01); *F16H 2200/0043* (2013.01); *F16H 2200/0095* (2013.01)

(58) Field of Classification Search
None
See application file for complete search history.

(56) References Cited

U.S. PATENT DOCUMENTS

| 3,979,972 | A | * | 9/1976 | Sakai | ...................... F16H 47/04 475/81 |
|---|---|---|---|---|---|
| 5,946,983 | A | | 9/1999 | Brambilla | |
| 6,565,471 | B2 | | 5/2003 | Weeramantry et al. | |
| 7,361,111 | B2 | | 4/2008 | Aitzetmueller et al. | |

(Continued)

FOREIGN PATENT DOCUMENTS

| CN | 102943859 | 2/2013 |
|---|---|---|
| WO | 2014095317 | 6/2014 |

OTHER PUBLICATIONS

J. Petric Paper by SAE International. A Power. Title: Split Hybrid Hydraulic Vehicle Transmission Modeling and Comparative Analysis, dated Oct. 5, 2010 (1 page).

(Continued)

*Primary Examiner* — Justin Holmes
(74) *Attorney, Agent, or Firm* — Rickard K. DeMille; Rebecca L. Henkel

(57) ABSTRACT

A system for operating a work vehicle may include an engine and a transmission coupled to the engine. The transmission may include a planetary gear unit configured to be selectively coupled to the engine by engaging one of two directional clutches of the transmission. The transmission may also include a hydrostatic drive unit having an input configured to be rotationally coupled to the engine and an output configured to be rotationally coupled to the planetary gear unit. Moreover, the transmission may include a bypass shaft assembly having a bypass shaft configured to be selectively coupled between the output of the hydrostatic drive unit and a given range clutch of the transmission via a bypass clutch. In addition, the system may include a controller configured to operate the transmission in a hydrostatic bypass mode by disengaging the directional clutches and by engaging the bypass clutch and the given range clutch.

20 Claims, 6 Drawing Sheets

(56) References Cited

U.S. PATENT DOCUMENTS

| | | |
|---|---|---|
| 8,469,850 B2 | 6/2013 | Stoeckl et al. |
| 8,986,162 B2 | 3/2015 | Dix et al. |
| 2008/0155974 A1 | 7/2008 | Aitzetmueller et al. |
| 2011/0166752 A1 | 7/2011 | Dix et al. |
| 2012/0125730 A1* | 5/2012 | Moloney ............... F16H 47/04 192/48.1 |
| 2014/0188354 A1* | 7/2014 | Guo ..................... B60W 10/04 701/53 |
| 2014/0207350 A1* | 7/2014 | Dix ....................... F16D 48/02 701/68 |
| 2014/0248986 A1 | 9/2014 | Weeramantry et al. |
| 2015/0292610 A1* | 10/2015 | Rintoo ................... F16H 47/04 475/72 |

OTHER PUBLICATIONS

Heinz Aitzetmuller International Conference on Gears. Title: Variable Drive System (VDS)—Hydrostatic—Mechanical Power Split Transmission for Locomotives, dated Oct. 4, 2010 (10 pages).
Horst Schulte and Patrick Gerland Published by Atlantis Press, Title: Control-Oriented Modeling of Hydrostatic Power-Split CVTs Using Takagi-Sugeno Fuzzy Models, dated 2011 (8 pages).
Xuegin Ni Article—Chinese Society of Agriculture, dated Jun. 2013. (1 page).

\* cited by examiner

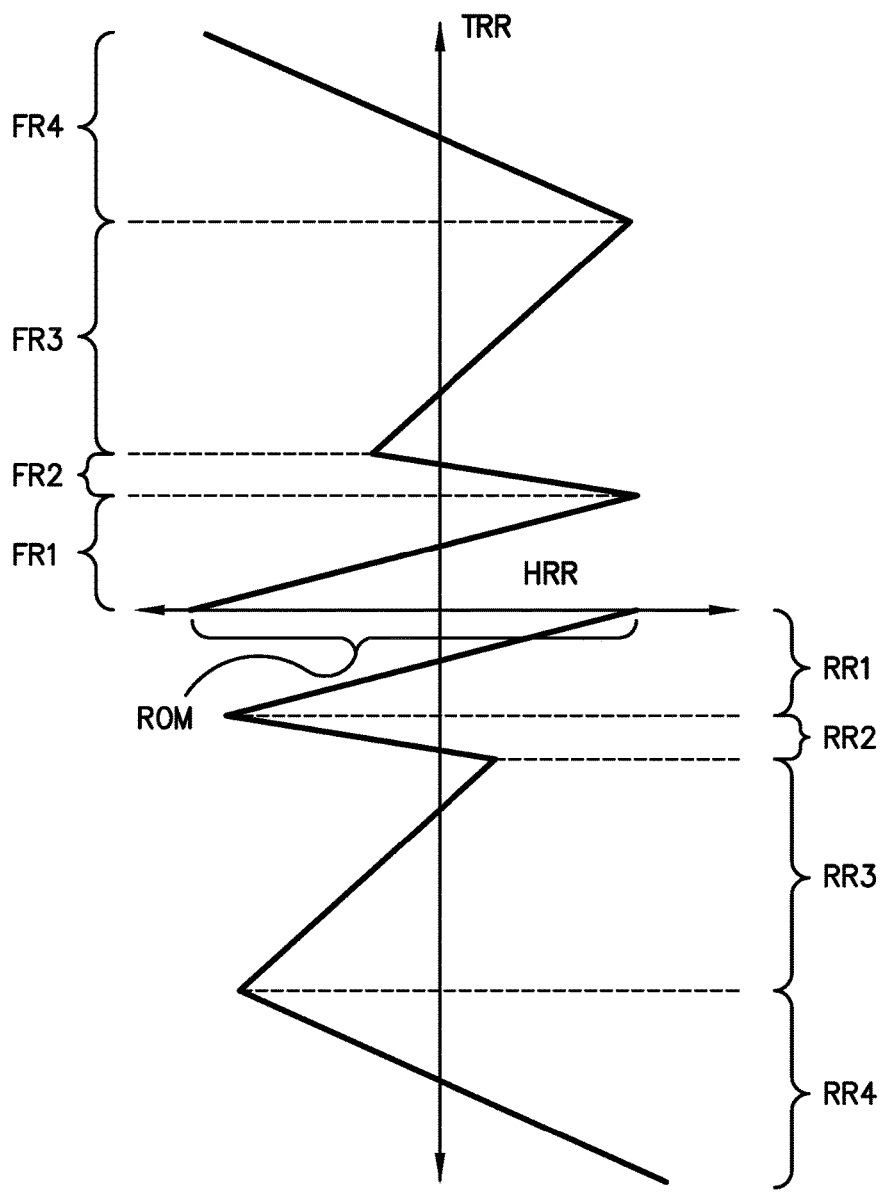
FIG. -1-
( PRIOR ART )

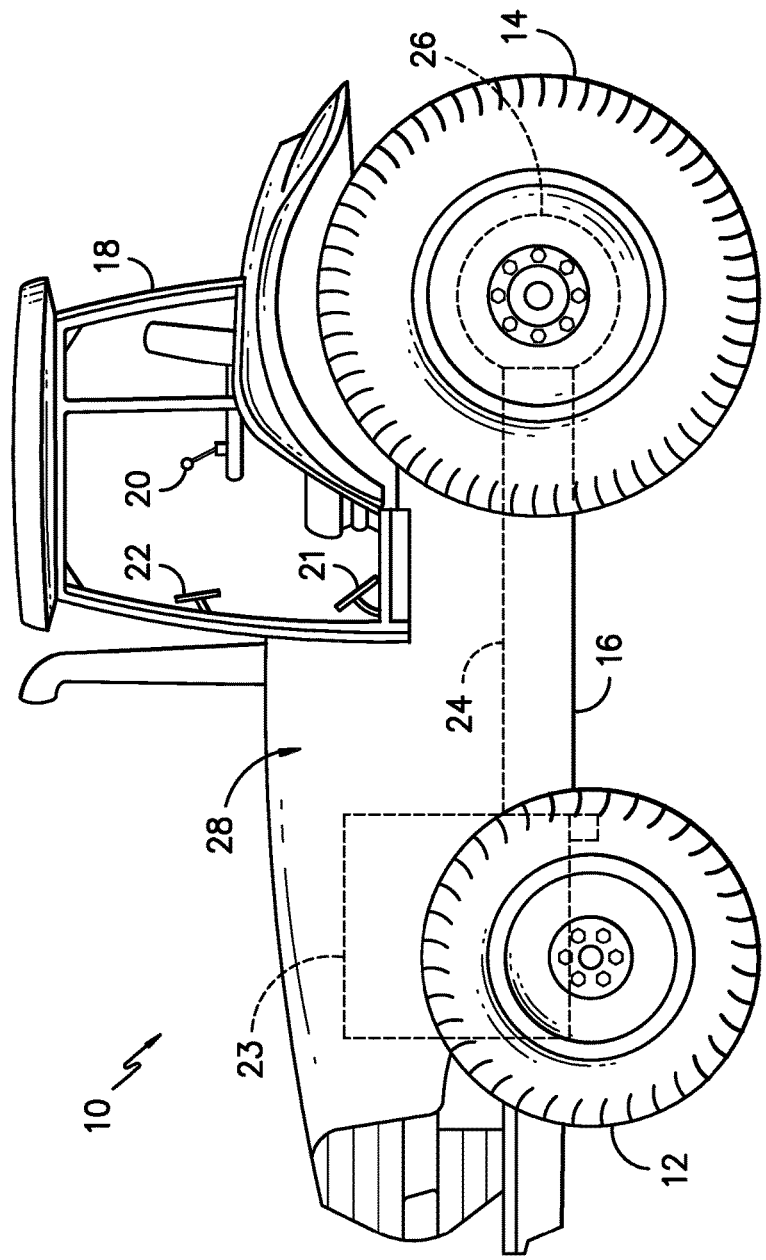
FIG. -2-

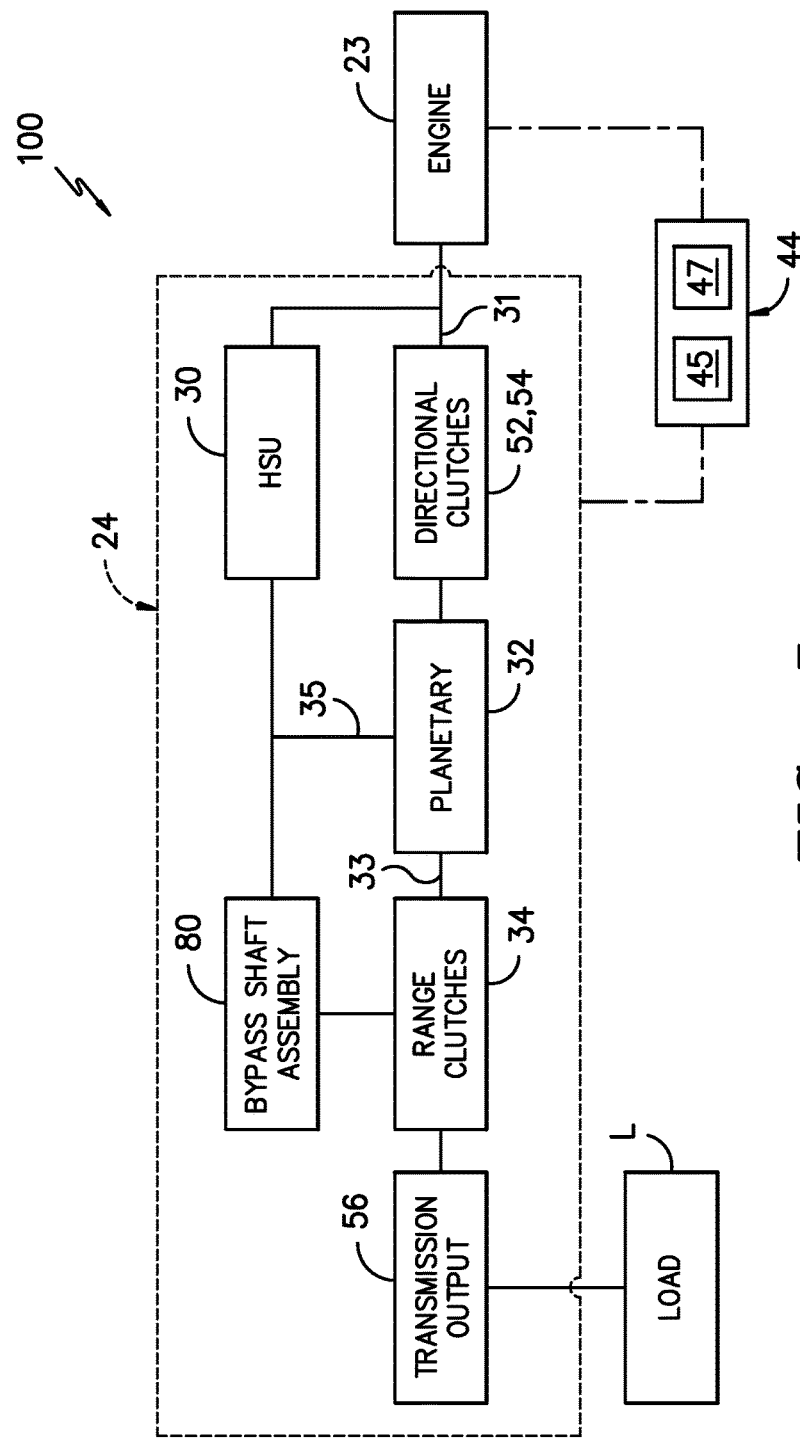
FIG. -3-

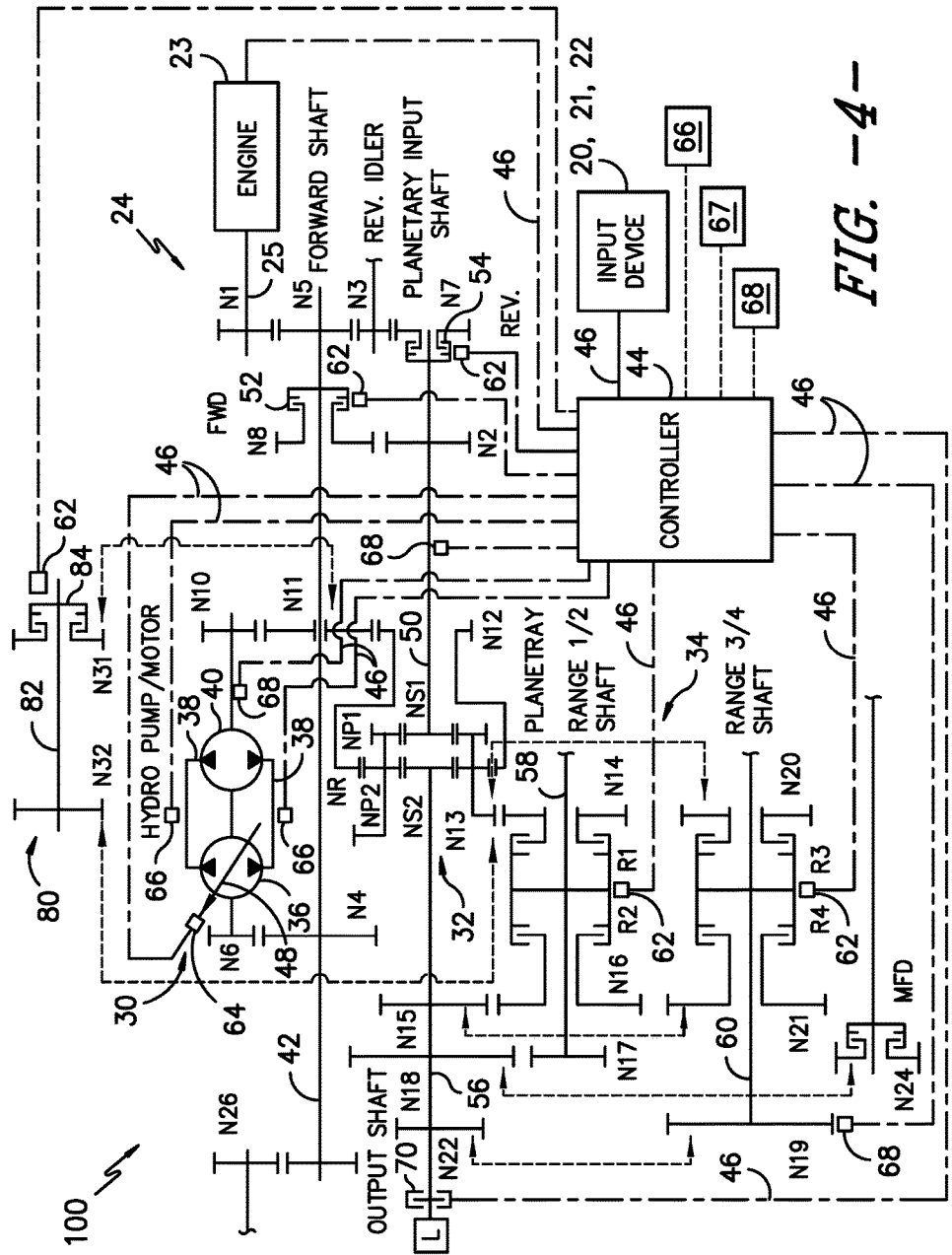
FIG. -4-

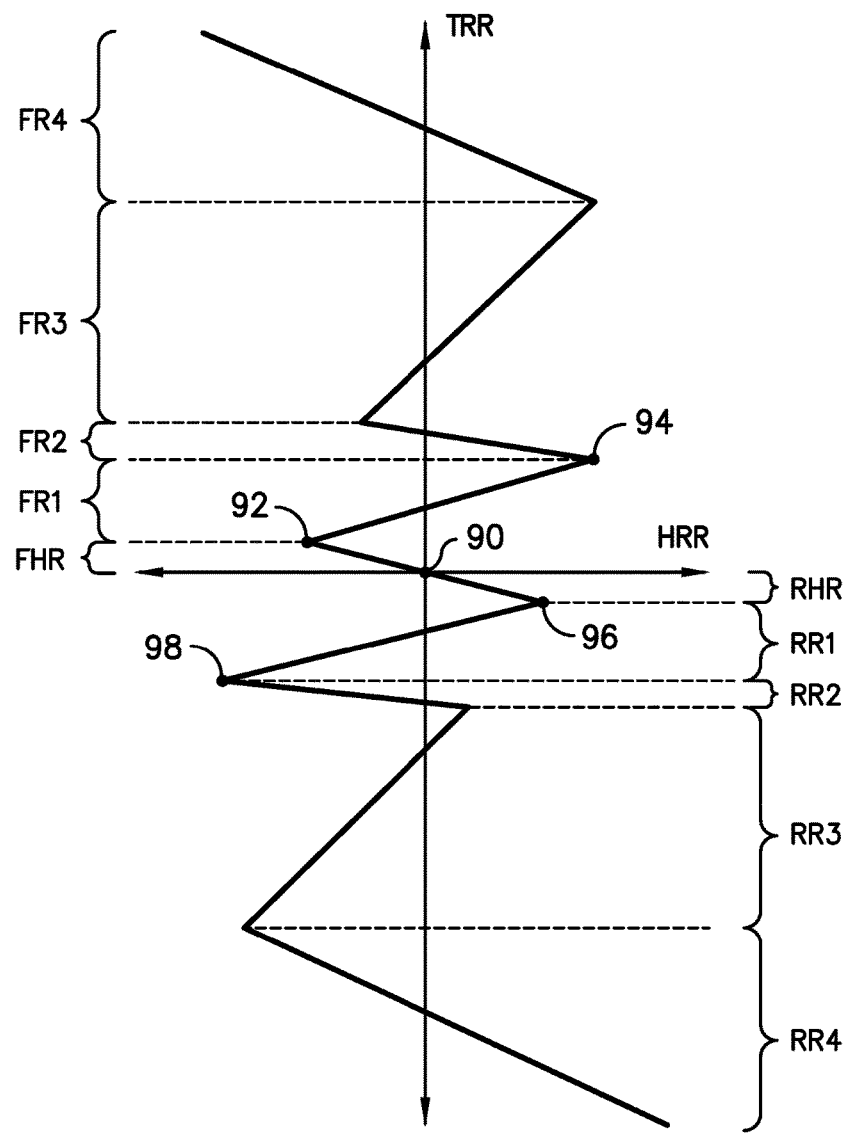
FIG. -5-

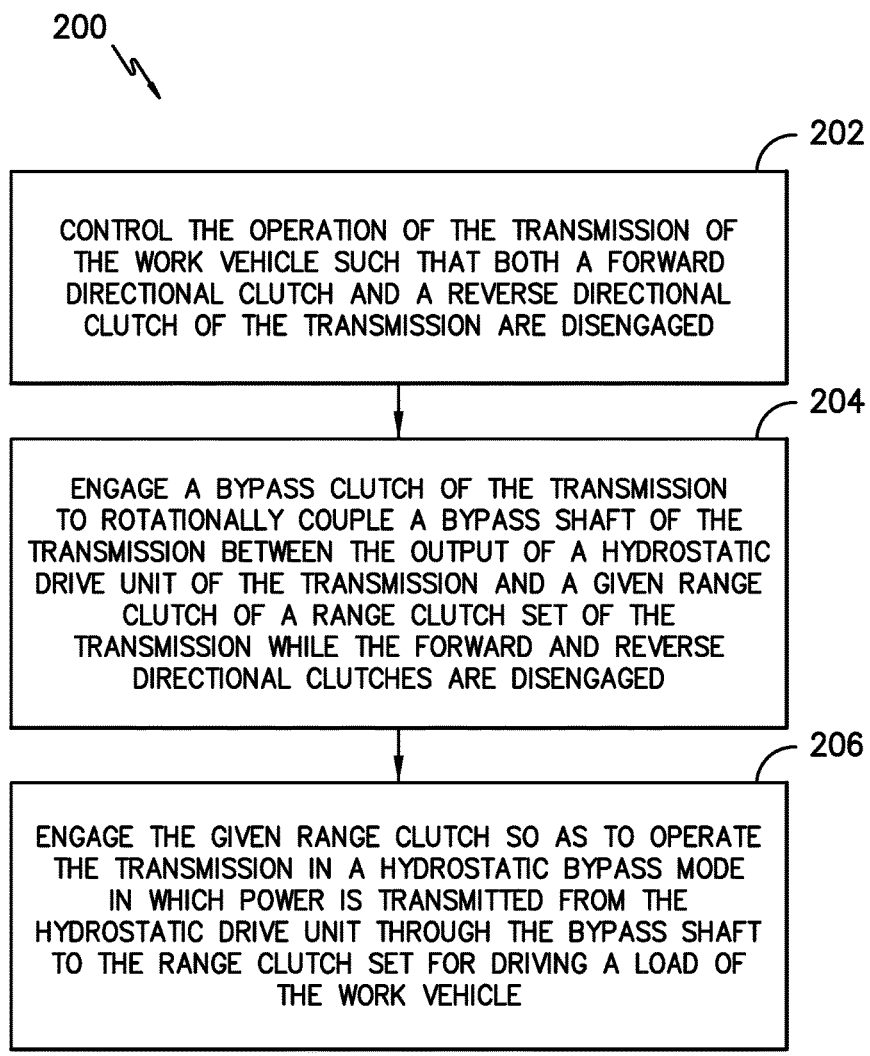
FIG. -6-

SYSTEM AND METHOD FOR OPERATING A CONTINUOUSLY VARIABLE TRANSMISSION OF A WORK VEHICLE IN A HYDROSTATIC BYPASS MODE

FIELD OF THE INVENTION

The present subject matter relates generally to work vehicles and, more particularly, to a system and method for operating a continuously variable transmission of a work vehicle in a hydrostatic bypass mode using a bypass shaft assembly that bypasses the planetary gear unit of the transmission.

BACKGROUND OF THE INVENTION

Continuously variable transmissions (CVTs) utilizing both a planetary gear unit and a hydrostatic drive unit are well known. A variety of work machines use this type of transmission for industries such as agriculture, earth moving, construction, forestry, and mining. The hydrostatic drive unit allows the transmission to be operated in a hydro-mechanical mode in which a hydrostatic power flow is transmitted to the planetary gear unit from the hydrostatic drive unit and a mechanical power flow is transmitted to the planetary gear unit via a mechanical connection provided between the planetary gear unit and the engine. During operation, fluid displacement of the hydrostatic drive unit is varied to continuously change the output-to-input ratio of the transmission (i.e., the transmission ratio). This is accomplished by adjusting the angle of a swash plate of a variable displacement fluid pump or motor of the hydrostatic drive unit.

For current hydro-mechanical CVTs, shuttle shifting of the transmission requires the swash plate to be moved across its full range of travel at zero ground speed to shift from forward to reverse or vice versa. For example, FIG. 1 illustrates a graphical representation of the typical relationship between the transmission reciprocal ratio (i.e., the transmission output speed divided by the engine speed (or the transmission input speed)), denoted TRR, and the hydrostatic drive unit ratio (motor speed/pump speed), denoted HRR, of a conventional hydro-mechanical CVT having four selectable forward speed ranges and four selectable reverse speed ranges of operation: namely, forward speed range 1 or low (FR1); forward speed range 2 (FR2); forward speed range 3 (FR3); forward speed range 4 (FR4); reverse speed range 1 (RR1); reverse speed range 2 (RR2); reverse speed range 3 (RR3); and reverse speed range 4 (RR4). As is generally understood, the HRR is directly related to the swash plate angle of the pump of the hydrostatic drive unit. Accordingly, as the swash plate is moved, the transmission ratio, and, thus, the speed of the work vehicle is varied across a given speed range.

As shown in FIG. 1, for each of the speed ranges, the zero tilt position of the swash plate (e.g., indicated by the vertical TRR axis) lies between the maximum degrees of tilt in the opposite directions of movement of the swash plate. Thus, at the lowest HRR for the forward speed range FR1, the swash plate is typically at or near maximum tilt in the left hand or negative direction (which is also the zero speed ratio for the transmission for the forward direction). In addition, as shown in FIG. 1, to go from zero speed in the forward speed range FR1 to zero speed in the lowest speed range in the reverse direction (i.e., reverse speed range RR1), the swash plate must travel substantially its entire range of movement, as depicted by distance ROM. Thus, to perform a forward-to-reverse shuttle shift, not only must the forward and reverse directional clutches be swapped within the transmission, but the swash plate must also be moved the distance ROM. Such required movement of the swash plate significantly reduces the efficiency and smoothness while increasing the total time of shuttle shifting within the transmission.

Various systems have been proposed for addressing the issues associated with shuttle shifting within a conventional hydro-mechanical CVT. However, current systems still suffer from various drawbacks and fail to provide a complete solution for shuttle shifting.

Moreover, in addition to the difficulties associated with shuttle shifting, conventional hydro-mechanical CVTs also exhibit further issues when operating at low ground speeds. For instance, typical input-coupled systems start with large power generation and sacrifice system efficiency. Such hydraulic power regeneration not only reduces the system efficiency, but also increases the power through the mechanical branch of the transmission, which, in turn, imposes a significant limitation on the design of the mechanical gear train.

Accordingly, a system and method for operating a continuously variable transmission of a work vehicle in a manner that addresses one or more of the issues identified above is desired. In particular, a system and method for operating a continuously variable transmission of a work vehicle in a hydrostatic bypass mode that improves shuttle shifting performance and/or increases system efficiency at low ground speeds would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for operating a work vehicle. The system may include an engine having an output shaft and a transmission coupled to the engine. The transmission may include a planetary gear unit configured to be selectively coupled to the output shaft of the engine by engaging one of a forward directional clutch or a reverse directional clutch of the transmission. The transmission may also include a range clutch set configured to be rotationally coupled to the planetary gear unit and a hydrostatic drive unit having an input configured to be rotationally coupled to the output shaft of the engine and an output configured to be rotationally coupled to the planetary gear unit. Moreover, the transmission may include a bypass shaft assembly having a bypass shaft configured to be selectively coupled between the output of the hydrostatic drive unit and a given range clutch of the range clutch set via a bypass clutch. In addition, the system may include a controller communicatively coupled to the transmission. The controller may be configured to operate the transmission in a hydrostatic bypass mode by disengaging the forward and reverse directional clutches and by engaging the bypass clutch and the given range clutch to allow power to be transmitted from the hydrostatic drive unit through the bypass shaft assembly to the range clutch set for driving a load of the work vehicle.

In another aspect, the present subject matter is directed to a method for operating a work vehicle that includes an engine and a transmission coupled to the engine. The transmission may include a planetary gear unit, a range clutch set configured to be rotationally coupled to the planetary gear unit, and a hydrostatic drive unit having an input configured to be rotationally coupled to the engine and an output configured to be rotationally coupled to the planetary gear unit. The method may include controlling, with a computing device, an operation of the transmission such that both a forward directional clutch and a reverse directional clutch of the transmission are disengaged. The method may also include engaging, with the computing device, a bypass clutch of a bypass shaft assembly of the transmission to rotationally couple a bypass shaft of the bypass shaft assembly between the output of the hydrostatic drive unit and a given range clutch of the range clutch set while the forward and reverse directional clutches are disengaged. In addition, the method may include engaging, with the computing device, the given range clutch of the range clutch set so as to operate the transmission in a hydrostatic bypass mode in which power is transmitted from the hydrostatic drive unit through the bypass shaft assembly to the range clutch set for driving a load of the work vehicle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a graphical representation of the typical relationship between the transmission reciprocal ratio, denoted TRR, and the hydrostatic drive unit ratio, denoted HRR, for a conventional hydro-mechanical CVT having four selectable forward speed ranges and four selectable reverse speed ranges;

FIG. 2 illustrates a side view of one embodiment of a work vehicle in accordance with aspects of the present subject matter;

FIG. 3 illustrates a simplified, schematic view of one embodiment of a system for operating a continuously variable transmission of a work vehicle in a hydrostatic bypass mode in accordance with aspects of the present subject matter;

FIG. 4 illustrates a detailed, schematic view of a particular embodiment of the system shown in FIG. 3, particularly illustrating one embodiment of a suitable transmission configuration in accordance with aspects of the present subject matter;

FIG. 5 illustrates a graphical representation of an example relationship between the transmission reciprocal ratio, denoted TRR, and the hydrostatic drive unit ratio, denoted HRR, for the transmission shown in FIG. 4; and FIG. 6 illustrates a flow diagram of one embodiment of a method for operating a continuously variable transmission of a work vehicle in a hydrostatic bypass mode in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for operating a work vehicle. In particular, the present subject matter discloses a system and method for operating a continuously variable transmission of a work vehicle in a hydrostatic bypass mode. Specifically, in several embodiments, the transmission may include a bypass shaft assembly that allows for power generated by the hydrostatic drive unit of the transmission to bypass the planetary gear unit and be delivered directly to the transmission's range clutch set. As such, the transmission may be operated within a pure hydrostatic bypass mode at low ground speeds that provides increased system efficiency and full power capability as well as improved shuttle shifting performance. For instance, as will be described below, shuttle shifting within the hydrostatic bypass mode may be performed by simply actuating the swash plate across its zero tilt angle (e.g., to a negative tilt angle or a positive tilt angle depending on the direction of the shuttle shift) without requiring the swash plate to be moved across it full range of motion at zero ground speed.

Referring now to the drawings, FIG. 2 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 2, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 2, the work vehicle 10 may include a Forward-Neutral-Reverse-Park (FNRP) lever 20 and a clutch pedal 21. In addition, the work vehicle 10 may include a display panel 22 for displaying message windows and/or alerts to the operator and/or for allowing the operator to interface with the vehicle's controller. For instance, in one embodiment, the display panel 22 may include a touch screen and/or associated buttons or other input devices that allow the operator to provide user inputs to the controller.

Moreover, the work vehicle 10 may include an engine 23 and a transmission 24 mounted on the chassis 16. The transmission 24 may be operably coupled to the engine 23 and may provide variably adjusted gear ratios for transferring engine power to the wheels 14 via an axle/differential 26. The engine 23, transmission 24, and axle/differential 26 may collectively define a drivetrain 28 of the work vehicle 10.

It should be appreciated that the configuration of the work vehicle 10 described above and shown in FIG. 2 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 23, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Referring now to FIG. 3, a simplified, schematic view of one embodiment of a system 100 operating a continuously variable transmission of a work vehicle in a hydrostatic bypass mode is illustrated in accordance with aspects of the present subject matter. As shown, the system includes an engine (e.g., engine 23 of FIG. 2) and a continuously variable transmission or "CVT" (e.g., transmission 24 of FIG. 2). The transmission 24 may include both a hydrostatic drive unit 30 and a planetary gear unit 32 configured to be driven by the engine 23 via one or more shafts and gears 31. An output 33 from the planetary gear unit 43 is transferred through one of a plurality of range clutches 34 of the transmission 24 to produce a transmission output 56, which, in turn, drives a load L (e.g., the drive wheels, such as the front and/or rear wheels 12, 14 of the work vehicle 10). Additionally, as shown in FIG. 3, the transmission 24 may also include directional clutches (e.g., a forward clutch 52 and a reverse clutch 54) coupled between the engine 23 and the planetary gear unit 32 for controlling the direction of the rotation of the transmission output 56.

During typical operation, the engine 23 drives the hydrostatic drive unit 30 using the shaft(s)/gear(s) 31. The shaft(s)/gear(s) 31 also drive an input to the directional clutches 52, 54. The output of the selected directional clutch 52, 54 (e.g., forward or reverse) then drives the planetary gear unit 32. In addition, as shown, the hydrostatic drive unit 30 may be coupled to the planetary gear unit 32 via one or more shafts and gears 35. For instance, the shaft(s)/gear(s) 35 may be configured to couple the hydrostatic drive unit 30 to a ring gear (not shown) of the planetary gear unit 32. Given such configuration, the transmission 24 may be operated in either a hydrostatic mode or a hydro-mechanical mode. For instance, by disengaging both directional clutches 52, 54, the transmission 24 may be operated in a hydrostatic mode in which a hydrostatic power flow is transmitted to the planetary gear unit 32 solely from the hydrostatic drive unit 30. Alternatively, by engaging one of the directional clutches 52, 54, the transmission 24 may be operated in a hydro-mechanical mode in which a hydrostatic power flow is transmitted to the planetary gear unit 32 from the hydrostatic drive unit 30 and a mechanical power flow is transmitted to the planetary gear unit 32 from the engine 23 via the mechanical coupling provided by the selected directional clutch 52, 54.

Moreover, as shown in FIG. 3, the system 100 may also include a bypass shaft assembly 80 coupled between the hydrostatic drive unit 30 and the range clutches 34 that bypasses the planetary gear unit 32. As will be described below, the bypass shaft assembly 80 may include a bypass clutch for engaging the shaft assembly 80 with the output of the hydrostatic drive unit 30. As such, by engaging the bypass clutch and disengaging the directional clutches 52, 54, the transmission 24 may be operated in a hydrostatic bypass mode in which the hydrostatic power flow from the hydrostatic drive unit 30 bypasses the planetary gear unit 32 and is transferred directly to one of the range clutches 34. Use of such a hydrostatic bypass mode may allow for increased system efficiency and reduced power regeneration at low vehicle speeds. Additionally, as will be highlighted below, the hydrostatic bypass mode may provide for seamless shuttle shifting of the transmission 24.

It should be appreciated that the system 100 may also include a controller 44 for electronically controlling the operation of one or more of the system components, such as the engine 23 and/or the transmission 24. In general, the controller 44 may correspond to any suitable processor-based device known in the art, such as any computing device and/or combination of computing devices. Thus, in several embodiments, the controller 44 may include one or more processor(s) 45 and associated memory device(s) 47 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 47 of the controller 44 may generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 47 may generally be configured to store suitable computer-readable instructions that, when implemented by the processor(s) 45, configure the controller 44 to perform various computer-implemented functions, such as the method 200 described below with reference to FIG. 6. In addition, the controller 44 may also include various other suitable components, such as a communications circuit or module, one or more input/output channels, a data/control bus and/or the like.

Referring now to FIG. 4, a detailed, schematic view of a particular embodiment of the system 100 described above is illustrated in accordance with aspects of the present subject matter, particularly illustrating one embodiment of a suitable transmission configuration for use within the system 100. As shown, the system 100 includes an engine (e.g., engine 23 of FIG. 2) and a continuously variable transmission or "CVT" (e.g., transmission 24 of FIG. 2). The transmission 24 may include a hydrostatic drive unit 30 and a planetary gear unit 32. The hydrostatic drive unit 30 and the planetary gear unit 32 may be coupled to a driveline including a range gear set 34 and may also be coupled to a load L. For example, in one embodiment, the load L may correspond to the drive wheels of the work vehicle 10 (e.g., the front and/or rear wheels 12, 14 of the work vehicle 10). Alternatively, the hydrostatic drive unit 30 and the planetary gear unit 32 may be coupled to any other suitable load L, such as loads that include a track drive or a separate operating system of the work vehicle 10.

The hydrostatic drive unit 30 of the transmission 24 may generally include a fluid pump 36 coupled by fluid conduits 38 in a closed loop to a fluid motor 40. The pump 36 may be coupled to the engine 23 via an input gear N6. Specifically, as shown in FIG. 4, power may be transmitted to the hydrostatic drive unit 30 by a driven gear N4 mounted on a forward shaft 42 of the transmission 10 and engaged with the input gear N6. In addition, an output gear N10 for the hydrostatic drive unit 30 may be connected to a ring gear NR of the planetary gear unit 32 via gears N11 and N12. A power take off (PTO) of the vehicle 10 may also be coupled to the engine 23 through the forward shaft 42 (e.g., by coupling a PTO gear reduction N26 to the forward shaft 42, which is coupled to an output shaft 25 of the engine 23 via gears N5 and N1.

In general, the pump 36 may comprise any suitable electronically controlled pump known in the art, such as an electronically controlled variable displacement hydraulic pump. As such, operation of the pump 36 may be automatically controlled using an electronic controller 44 of the work vehicle 10. For example, as shown in FIG. 4, the controller 44 may be communicatively coupled to the pump 36 via a suitable communicative link 46 so that the angle of a swash plate of the pump 36 (the swash plate being denoted by a diagonal arrow 48 through pump 36) may be adjusted through a range of positions, thereby adjusting the transmission ratio of the transmission 24.

Referring still to FIG. 4, the planetary gear unit 32 of the transmission 24 may generally include a primary sun gear NS1 mounted on a planetary input shaft 50. As shown, the planetary input shaft 50 may be coupled to the engine 23 via a forward directional clutch 52 or a reverse directional clutch 54. In addition, the planetary gear unit 32 may be configured to be selectively coupled to the load L, coupled to the hydrostatic driver unit 30, and selectively coupled to the engine 23, all under automatic control of the controller 44. For example, for coupling the planetary gear unit 32 to the load L, the transmission 24 may include an output shaft 56 coupled to the load L which carries an input gear N18 engaged with an output gear N17 on a range ½ shaft 58 of the range gear set 34 and a gear N22 engaged with a gear N19 on a range ¾ shaft 60 of the range gear set 34. The range ½ shaft 58 may, in turn, be coupled to the planetary gear unit 32 via automatic operation of range selectors or clutches R1 and R2 for power flow through gears N13 and N14, or N15 and N16, respectively. Similarly, the range ¾ shaft 60 may be coupled to the planetary gear unit 32 via range selectors or clutches R3 and R4 for power flow via gears N13 and N20, or N15 and N21, respectively. The range ½ and ¾ shafts 58, 60 may also be simultaneously coupled to the planetary gear unit 32 to provide dual power flow. It should be appreciated that operation of the various clutches (e.g., the forward directional clutch 52, the reverse directional clutch 54, the range clutches R1, R2, R3 and R4, and any other clutches of the transmission 24) may be automatically controlled by the controller 44 using suitable hydraulic actuators 62 (e.g., hydraulic pistons).

The controller 44 may also be communicatively coupled to a swash plate actuator 64 for automatically controlling the position or angle of the swash plate 48 of the pump 36. For example, the actuator 64 may be configured to move the swash plate 48 across a range of tilt angles in response to control signals (e.g., current commands) received from the controller 44. As is generally understood, speed changes from the minimum speed to the maximum speed within each speed range of the transmission 24 may be achieved in a smooth and continuous manner by automatically changing the swash plate tilt angle of the pump 36 via control signals transmitted from the controller 44. For each speed range, substantially the full range of travel of the swash plate may be used. For example, in several embodiments, the swash plate 48 may be at one end of its range of travel for the minimum speed within a specific speed range, may be at the other end of its range of travel for the maximum speed of that speed range and may be at a zero tilt angle or neutral position within its range of travel for an intermediate speed of that same speed range.

In addition, the controller 44 may be coupled to any number of sensors for monitoring the various operating parameters of the transmission 24 including, but not limited to, pressure transducers or sensors 66 for sensing the pressure within the conduits 38 connecting the pump 36 to the motor 40 and/or for sensing the pressure of the hydraulic fluid supplied to each clutch of the transmission 24, speed sensors 67 for sensing the output speed of the transmission 24, the speed(s) of the various clutches (and/or clutch cans) of the transmission 24 and/or the motor speed of the fluid motor 40, swash plate sensors 68 for monitoring the tilt angle of the swash plate 48 and/or any other suitable sensors. Similarly, the controller 44 may also be connected to the engine 23 (e.g., a speed governor of the engine 23) for receiving engine speed data and other information therefrom.

Additionally, as shown in FIG. 4, the controller 44 may also be communicatively coupled to the operator-controlled input device(s) 20, 21, 22 positioned within the cab 18 via a suitable communicative link 46. For example, the controller 44 may be coupled to the FRNP lever 20, the clutch pedal 21, the display panel 22 and/or any other suitable input device of the vehicle 10 (e.g., the speed control lever or pedal, the engine throttle lever, the neutral button and/or any other suitable lever, pedal, button or control panel of the vehicle 10).

Referring still to FIG. 4, the transmission 24 may also include a parking brake 70 operably positioned on the output shaft 56. In several embodiments, the parking brake 70 may be communicatively coupled to the controller 44 (via a suitable communicative link 46) for automatic control thereof. For example, the controller 44 may be configured to proportionally or gradually engage the parking brake 70 as well as gradually release or disengage the parking brake 70. In such embodiments, the pressure of the hydraulic fluid supplied to the parking brake 70 may be controlled using an automatic valve (e.g., a proportional pressure reducing valve) configured to be operated via control signals transmitted from the controller 44. As is generally understood, the parking brake pressure may be inversely related to the parking brake torque. Thus, contrary to the various clutches of the transmission 24, the parking brake 70 may be designed such that it is engaged when the pressure within the brake 70 is reduced and disengaged when the pressure within the brake 70 is increased.

During typical operation, the transmission 24 may be operated to have a combined hydrostatic and mechanical power flow by engaging the reverse directional clutch 54 to the power planetary gear unit 32 via gears N1, N3, N5 and N7, or engaging the forward directional clutch 52 to power the planetary gear unit 32 via gears N1, N8, and N2. Alternatively, the transmission 44 may be operated to have a pure hydrostatic power flow to the planetary gear unit 32 by disengaging both of the directional clutches 52, 54. In such instance, the power may be transmitted to the planetary gear unit 32 solely from the hydrostatic drive unit 30.

Additionally, in accordance with aspects of the present subject matter, the transmission 24 may also include a bypass shaft assembly 80 coupled between the hydrostatic drive unit 30 and the range clutch set 34 for operating the transmission 24 within a hydrostatic bypass mode. As shown in FIG. 4, the bypass shaft assembly 80 may include a bypass shaft 82, an input gear N31 configured to be rotationally coupled to the output of the hydrostatic drive unit 30, and an output gear N32 configured to be rotationally coupled to an input gear of the range clutch set 34. Specifically, in the illustrated embodiment, the input gear N31 is coupled to the output of the hydrostatic drive unit 30 via gear N11. However, in other embodiments, the input gear N31 may be coupled to the output of the hydrostatic drive unit 30 via any other suitable gear and/or other means. Similarly, in the illustrated embodiment, the output gear N32 is coupled to the input gear N14 associated with the first range clutch R1. However, in other embodiments, the output gear N32 may be coupled to the input gear associated with any other suitable range clutch of the range clutch set 34, such as one of gears N16, N20, or N21.

Moreover, as shown in FIG. 4, the bypass shaft assembly 80 may also include a bypass clutch 84 for selectively coupling the bypass shaft 82 to the input gear N31. Specifically, in several embodiments, the controller 44 may be configured to electronically control the operation of the bypass clutch 84 (e.g., via an actuator 62) depending on the desired operational mode for the transmission 24. Specifically, when it is desired to operate the transmission 24 in the disclosed hydrostatic bypass mode, the bypass clutch 84 may be engaged to allow a hydrostatic power flow to be transmitted from the hydrostatic drive unit 30 through the bypass shaft assembly 80 to the range clutch set 34 (e.g., via gear N14). In such instance, by engaging the first range clutch R1, the hydrostatic power flow transmitted through the bypass shaft assembly 80 may be transferred to the output shaft 56 coupled to the load L via shaft 58 and the engagement of gears N18/N17. Similarly, when it is desired to operate the transmission 24 in a different operating mode (e.g., in the hydro-mechanical mode or the typical hydrostatic mode), the bypass clutch 84 may be disengaged to decouple the bypass shaft 82 from the output of the hydrostatic drive unit 30.

It should be appreciated that the configuration of the transmission 24 shown in FIG. 4 simply illustrates one example of a suitable transmission with which the disclosed system and method may be utilized. Thus, one of ordinary skill in the art should appreciate that application of the present subject matter need not be limited to the particular CVT configuration shown in FIG. 4, but, rather, the present subject matter may be advantageously used with various different CVT configurations.

Referring now to FIG. 5, a graphical representation of an example relationship between the transmission reciprocal ratio (i.e., the transmission output speed divided by the engine speed (or the transmission input speed)), denoted TRR, and the hydrostatic drive unit ratio (motor speed/pump speed), denoted HRR, for the transmission 24 shown in FIG. 4 is illustrated in accordance with aspects of the present subject matter. As shown, the transmission 24 includes four selectable forward hydro-mechanical speed ranges and four selectable reverse hydro-mechanical speed ranges of operation: namely, forward speed range 1 (FR1); forward speed range 2 (FR2); forward speed range 3 (FR3); forward speed range 4 (FR4); reverse speed range 1 (RR1); reverse speed range 2 (RR2); reverse speed range 3 (RR3); and reverse speed range 4 (RR4). In addition, the transmission 24 includes two selectable hydrostatic bypass speed ranges: names, a forward hydrostatic speed range (FHR) and a reverse hydrostatic speed range (RHR). As shown, the hydrostatic speed ranges (FHR and RHR) may correspond to the "low" speed ranges of the transmission 24.

As is generally understood, the hydro-mechanical speed ranges may be implemented by engaging one of the forward directional clutch 52 or the reverse directional clutch 54 in combination with one of the range clutches R1, R2, R3, R4. For instance, to implement forward speed range 1 (FR1), both the forward directional clutch 52 and the first range clutch R1 may be engaged within the transmission 24. Similarly, to implement reverse speed range 2 (RR2), both the reverse directional clutch 54 and the second range clutch R2 may be engaged. Moreover, the hydrostatic bypass speed ranges may be implemented by engaging both the bypass clutch 84 and the first range clutch R1 and by disengaging both of the directional clutches 52, 54. In such speed ranges, the direction of the vehicle 10 (e.g., forward or reverse) may be controlled solely due to the position of the swash plate relative to its zero tilt angle (with the zero tilt angle being defined along the vertical TRR axis). A clutch truth table for implementing the various forward hydro-mechanical speed ranges and the forward hydrostatic bypass speed range is provided below in Table 1, with a value of "1" indicating that the identified clutch is engaged for the associated speed range and a value of "0" indicating that the identified clutch is disengaged for the associated speed range.

TABLE 1

Clutch Truth Table for Forward Speed Ranges

| Range | Forward Clutch | Reverse Clutch | Bypass Clutch | R1 | R2 | R3 | R4 |
|---|---|---|---|---|---|---|---|
| FHR | 0 | 0 | 1 | 1 | 0 | 0 | 0 |
| FR1 | 1 | 0 | 0 | 1 | 0 | 0 | 0 |
| FR2 | 1 | 0 | 0 | 0 | 1 | 0 | 0 |
| FR3 | 1 | 0 | 0 | 0 | 0 | 1 | 0 |
| FR4 | 1 | 0 | 0 | 0 | 0 | 0 | 1 |

As shown in FIG. 5 (and referring to Table 1), a sequence of operations may be used to increase the vehicle speed from zero to its maximum speed in the forward direction. Specifically, when the vehicle 10 is at zero ground speed and the transmission 24 is being operated within its hydrostatic bypass mode, both the bypass clutch 84 and the first range clutch R1 are engaged while all other clutches are disengaged. To increase the vehicle speed from zero in the forward direction, the position of the swash plate 48 is changed from its zero tilt angle (e.g., indicated at point 90) to a negative tilt angle (e.g., in the left hand or negative direction in FIG. 5). The position of the swash plate 48 may continue to be moved to a more negative tilt angle until the shaft speed on either side of the forward directional clutch 52 is synchronized (e.g., at point 92), thereby allowing the transmission 24 to be shifted from the forward hydrostatic speed range (FHR) to the first forward hydro-mechanical speed range (FR1) by engaging the forward directional clutch 52 and disengaging the bypass clutch 84. Thereafter, to increase the vehicle speed in the first forward hydro-mechanical speed range (FR1), the position of the swash plate 48 may be moved from the negative tilt angle identified at point 92 across its zero tilt angle to a positive tilt angle (e.g., to point 94). The transition from the first forward hydro-mechanical speed range (FR1) to the second forward hydro-mechanical speed range (FR2) may then occur when the second range clutch R2 is synchronized (e.g., at the positive tilt angle indicated at point 94). Similarly, each successive transition in the forward direction can be shifted in a similar manner.

Additionally, a similar sequence of operations may be used to increase the vehicle speed from zero to its maximum speed in the reverse direction. Specifically, when the vehicle is at zero speed and the transmission 24 is being operated within its hydrostatic bypass mode, both the bypass clutch 84 and the first range clutch R1 are engaged while all other clutches are disengaged. To increase the vehicle speed from zero in the reverse direction, the position of the swash plate 48 is changed from its zero tilt angle (e.g., indicated at point 90) to a positive tilt angle (e.g., in the right hand or positive direction in FIG. 5). The position of the swash plate 48 may continue to be moved to a more positive tilt angle until the shaft speed on either side of the reverse directional clutch 54 is synchronized (e.g., at point 96), thereby allowing the transmission 24 to be shifted from the reverse hydrostatic speed range (RHR) to the first reverse hydro-mechanical speed range (RR1) by engaging the reverse directional clutch 54 and disengaging the bypass clutch 84. Thereafter, to increase the vehicle speed in the first reverse hydro-mechanical speed range (RR1), the position of the swash plate 48 may be moved from the positive tilt angle identified at point 96 across its zero tilt angle to a negative tilt angle (e.g., to point 98). The transition from the first reverse hydro-mechanical speed range (RR1) to the second reverse hydro-mechanical speed range (RR2) may then occur when the second range clutch R2 is synchronized (e.g., at the negative tilt angle indicated at point 98). Similarly, each successive transition in the reverse direction can be shifted in a similar manner.

Referring still to FIG. 5, by using the disclosed hydrostatic bypass mode, shuttle shifts can be performed quickly and efficiently. Specifically, unlike conventional shuttle shifting methods that require the swash plate 48 to be moved across its full range of motion (e.g., ROM shown in FIG. 1) to switch the vehicle motion from forward to reverse or vice versa, the hydrostatic bypass mode allows the swash plate 48 to be simply moved across the range of tilt angles defined between the negative tilt angle associated with transitioning the transmission to the first forward hydro-mechanical speed range (FR1) (e.g., at point 92) and the positive tilt angle associated with transitioning the transmission to the first reverse hydro-mechanical speed range (RR1) (e.g., at point 96). Specifically, the vehicle 10 may immediately transition from forward to reverse and vice versa within the hydrostatic bypass mode simply by moving the position of the swash plate 48 across its zero tilt angle to either a negative tilt angle or a positive tilt angle. As such, shuttle shifting may be performed without losing power or requiring a large shift in the position of the swash plate 48.

For instance, as shown in FIG. 5, to implement a forward-to-reverse shuttle shift when the work vehicle 10 is currently moving in the forward direction at a non-zero speed, the tilt angle of the swash plate 48 may be continuously increased from a negative tilt angle across its zero tilt angle to a positive tilt angle (e.g., along the path defined between points 92 and 96). In contrast, using the conventional shuttle shifting method shown in FIG. 1, the tilt angle would need to be decreased to its minimum or most negative tilt angle to first bring the ground speed to zero prior to shifting the swash plate 48 across its full range of motion ROM to its maximum or most positive tilt angle to then allow the vehicle speed to be increased in the reverse direction by decreasing the tilt angle from the maximum tilt angle. Similarly, as shown in FIG. 5, to implement a reverse-to-forward shuttle shift when the work vehicle 10 is currently moving in the reverse direction at a non-zero speed, the tilt angle of the swash plate 48 may be continuously decreased from a positive tilt angle across its zero tilt angle to a negative tilt angle (e.g., along the path defined between points 96 and 92). In contrast, using the conventional shuttle shifting method shown in FIG. 1, the tilt angle would need to be increased to its maximum or most positive tilt angle to first bring the ground speed to zero prior to shifting the swash plate 48 across its full range of motion ROM to its minimum or most negative tilt angle to then allow the vehicle speed to be increased in the forward direction by increasing the tilt angle from the minimum tilt angle.

It should be appreciated that the disclosed hydrostatic bypass mode may be implemented as an optional operational mode for a transmission. For instance, by maintaining the bypass clutch 84 disengaged, a continuously variable transmission may be operated in its conventional hydrostatic and hydro-mechanical modes. In such instance, the relationship between TRR and HRR for the transmission may follow the curve shown in FIG. 1.

Referring now to FIG. 6, a flow diagram of one embodiment of a method 200 for operating a work vehicle is illustrated, particularly illustrating a method for operating a continuously variable transmission of a work vehicle in a hydrostatic bypass mode in accordance with aspects of the present subject matter. In general, the method 200 will be described herein with reference to the system 100 described above with reference to FIGS. 3 and 4 as well as the work vehicle 10. described above with reference to FIG. 2. However, it should be appreciated by those of ordinary skill in the art that the disclosed method 200 may be implemented using any other suitable system (including any manner of CVT configuration) and/or within any other suitable work vehicle 10. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 includes controlling the operation of the transmission of the work vehicle such that both a forward directional clutch and a reverse directional clutch of the transmission are disengaged. For instance, as indicated above, the controller 44 may be configured to electronically control the operation of the various transmission clutches, including the forward and reverse directional clutches 52, 54. Thus, when desired, the controller 44 may transmit suitable control signals to cause the directional clutches 52, 54 to be disengaged. Similarly, if the forward and reverse directional clutches 52, 54 are already disengaged, the controller 44 may be configured to maintain such directional clutches 52, 54 in their disengaged states.

Additionally, at (204), the method 200 includes engaging a bypass clutch of the transmission to rotationally couple a bypass shaft of the transmission between the output of a hydrostatic drive unit of the transmission and a given range clutch of a range clutch set of the transmission while the forward and reverse directional clutches are disengaged. For instance, as indicated above, the bypass shaft assembly 80 may be coupled between the output of the hydrostatic drive unit 30 and the first range clutch R1 of the range clutch set 34 to provide a path for hydrostatic power flow between the hydrostatic drive unit 30 and the range clutch set 34 that bypass the planetary gear unit 32 of the transmission 24. In such an embodiment, the controller 44 may be configured to engage the bypass clutch 84 of the bypass shaft assembly 80 to rotationally couple the bypass shaft 82 to the output of the hydrostatic drive unit 30.

Moreover, at (206), the method 200 includes engaging the given range clutch so as to operate the transmission in a hydrostatic bypass mode in which power is transmitted from the hydrostatic drive unit through the bypass shaft assembly to the range clutch set for driving a load of the work vehicle. Specifically, as indicated above, when the directional clutches 52, 54 are disengaged while the bypass clutch 84 and the first range clutch R1 are engaged, a hydrostatic power flow may be transmitted from the hydrostatic drive unit 30 to the range clutch set 34 via the bypass shaft assembly 80 as opposed to the planetary gear unit 32 to allow the transmission 24 to rotationally drive a given load, such as the drive wheels of the work vehicle 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for operating a work vehicle, the system comprising:
   an engine including an output shaft;
   a transmission coupled to the engine, the transmission comprising:
      a planetary gear unit configured to be selectively coupled to the output shaft of the engine by engaging one of a forward directional clutch or a reverse directional clutch of the transmission;
      a range clutch set configured to be rotationally coupled to the planetary gear unit;
      a hydrostatic drive unit having an input configured to be rotationally coupled to the output shaft of the engine and an output configured to be rotationally coupled to the planetary gear unit; and
      a bypass shaft assembly including a bypass shaft configured to be selectively coupled between the output of the hydrostatic drive unit and a given range clutch of the range clutch set via a bypass clutch; and
   a controller communicatively coupled to the transmission, the controller being configured to operate the transmission in a hydrostatic bypass mode by disengaging the forward and reverse directional clutches and by engaging the bypass clutch and the given range clutch to allow power to be transmitted from the hydrostatic drive unit through the bypass shaft assembly to the range clutch set for driving a load of the work vehicle.

2. The system of claim 1, wherein the bypass shaft assembly further comprises an input gear configured to be rotationally coupled to the output of the hydrostatic drive unit and an output gear configured to be rotationally coupled to the given range clutch.

3. The system of claim 2, wherein the controller is configured to engage and disengage the bypass clutch to selectively couple the input gear to the bypass shaft.

4. The system of claim 2, wherein the output gear of the bypass shaft assembly is rotationally coupled to an input range gear associated with the given range clutch.

5. The system of claim 1, wherein the given range clutch corresponds to a first range clutch of the transmission, the first range clutch being associated with implementing a lowest hydro-mechanical speed range for the transmission.

6. The system of claim 1, wherein the hydrostatic drive unit includes a pump fluidly coupled to a motor, the pump including a swash plate configured to be actuated across a range of tilt angles.

7. The system of claim 6, wherein the controller is configured to control the actuation of the swash plate when operating the transmission within the hydrostatic bypass mode to implement a shuttle shift.

8. The system of claim 7, wherein the shuttle shift is implemented from a non-zero ground speed by continuously increasing a tilt angle of the swash plate from a negative tilt angle to a positive tilt angle.

9. The system of claim 7, wherein the shuttle shift is implemented from a non-zero ground speed by continuously decreasing a tilt angle of the swash plate from a positive tilt angle to a negative tilt angle.

10. The system of claim 1, wherein the power transmitted from the hydrostatic drive unit through the bypass shaft assembly to the range clutch set bypasses the planetary gear unit when operating the transmission within the hydrostatic bypass mode.

11. A method for operating a work vehicle including an engine and a transmission coupled to the engine, the transmission including a planetary gear unit, a range clutch set configured to be rotationally coupled to the planetary gear unit, and a hydrostatic drive unit having an input configured to be rotationally coupled to the engine and an output configured to be rotationally coupled to the planetary gear unit, the method comprising:
   controlling, with a computing device, an operation of the transmission such that both a forward directional clutch and a reverse directional clutch of the transmission are disengaged;
   while the forward and reverse directional clutches are disengaged, engaging, with the computing device, a bypass clutch of a bypass shaft assembly of the transmission to rotationally couple a bypass shaft of the bypass shaft assembly between the output of the hydrostatic drive unit and a given range clutch of the range clutch set; and
   engaging, with the computing device, the given range clutch of the range clutch set so as to operate the transmission in a hydrostatic bypass mode in which power is transmitted from the hydrostatic drive unit through the bypass shaft assembly to the range clutch set for driving a load of the work vehicle.

12. The method of claim 11, wherein the bypass shaft assembly further comprises an input gear configured to be rotationally coupled to the output of the hydrostatic drive unit and an output gear configured to be rotationally coupled to the given range clutch.

13. The method of claim 12, wherein engaging the bypass clutch comprises rotationally coupling the input gear of the bypass shaft assembly to the bypass shaft.

14. The method of claim 12, wherein the output gear of the bypass shaft assembly is rotationally coupled to an input range gear associated with the given range clutch.

15. The method of claim 11, wherein the given range clutch corresponds to a first range clutch of the transmission, the first range clutch being associated with implementing a lowest hydro-mechanical speed range for the transmission.

16. The method of claim 11, wherein the hydrostatic drive unit includes a pump fluidly coupled to a motor, the pump including a swash plate configured to be actuated across a range of tilt angles.

17. The method of claim 16, further comprising controlling the actuation of the swash plate across the range of tilt angles when operating the transmission within the hydrostatic bypass mode to implement a shuttle shift.

18. The method of claim 17, further comprising implementing the shuttle shift from a non-zero ground speed by continuously increasing a tilt angle of the swash plate from a negative tilt angle to a positive tilt angle.

19. The system of claim 17, further comprising implementing the shuttle shift from a non-zero ground speed by continuously decreasing a tilt angle of the swash plate from a positive tilt angle to a negative tilt angle.

20. The method of claim 11, wherein the power transmitted from the hydrostatic drive unit through the bypass shaft assembly to the range clutch set bypasses the planetary gear unit when operating the transmission within the hydrostatic bypass mode.

* * * * *